United States Patent [19]
McNeill, Jr. et al.

[11] Patent Number: 5,499,378
[45] Date of Patent: Mar. 12, 1996

[54] SMALL COMPUTER SYSTEM EMULATOR FOR NON-LOCAL SCSI DEVICES

[75] Inventors: Andrew B. McNeill, Jr., Deerfield Beach; Edward I. Wachtel, Boca Raton, both of Fla.

[73] Assignee: Internatinal Business Machines Corporation, Armonk, N.Y.

[21] Appl. No.: 263,168

[22] Filed: Jun. 21, 1994

Related U.S. Application Data

[63] Continuation of Ser. No. 812,197, Dec. 20, 1991, abandoned.

[51] Int. Cl.$^6$ .................................................. G06F 15/16
[52] U.S. Cl. ..................... 395/500; 395/800; 364/228; 364/280; 364/280.9; 364/284.2; 364/DIG. 1
[58] Field of Search .................................. 395/800, 500; 364/DIG. 1, 228, 280, 280.9, 284.2, DIG. 1

[56] References Cited

U.S. PATENT DOCUMENTS

| | | | |
|---|---|---|---|
| 4,888,680 | 12/1989 | Sander et al. | 395/500 |
| 5,073,854 | 12/1991 | Martin et al. | 364/425 |
| 5,093,776 | 3/1992 | Morss et al. | 395/500 |
| 5,129,036 | 7/1992 | Dean et al. | 395/2 |
| 5,170,466 | 12/1992 | Rogan et al. | 395/145 |
| 5,175,822 | 12/1992 | Dixon et al. | 395/275 |
| 5,185,864 | 2/1993 | Bonevento et al. | 395/275 |
| 5,204,951 | 4/1993 | Keener et al. | 395/325 |
| 5,214,695 | 5/1993 | Arnold et al. | 380/4 |

FOREIGN PATENT DOCUMENTS

| | | | |
|---|---|---|---|
| 0395416 | 4/1990 | European Pat. Off. | |
| 2220509 | 11/1989 | United Kingdom | G06F 13/12 |

OTHER PUBLICATIONS

IBM TDB Vol. 30, No. 9 Feb. 1988.

Primary Examiner—Alyssa H. Bowler
Assistant Examiner—D. Nguyen
Attorney, Agent, or Firm—Bernard D. Bogdon

[57] ABSTRACT

A SCSI computer system is provided whereby a host computer gains access to a targeted but non-local peripheral device, which device or devices are individually responsive to either SCSI or non-SCSI commands, by sending SCSI commands via a SCSI bus to a connected SCSI target computer which emulates the targeted peripheral device local to the SCSI target computer, whether the targeted peripheral device is responsive to only SCSI or only non-SCSI commands, to cause the targeted peripheral device to carry out the initial SCSI commands.

1 Claim, 9 Drawing Sheets

SMALL COMPUTER SYSTEM EMULATOR FOR NON-LOCAL SCSI DEVICES

This is a continuation of patent application Ser. No. 07/812,197 filed on Dec. 20, 1991, now abandoned.

FIELD AND BACKGROUND OF DISCLOSURE

The American National Standard Institute has a standard for defining an input/output bus for interconnecting small computers and peripheral devices. The standard is referred to as the Small Computer System Interface (SCSI) Standard. It provides standardization of the defined command sets.

SCSI is a local I/O bus that can be operated over a wide range of data rates. The primary objective of the SCSI interface is to provide host computers with device independence within a class of devices. Thus, different disk drives, tape drives, printers, optical media drives, and other devices can be added to the host computers without requiring modifications to generic system hardware or software. Provision is made for the addition of special features and functions through the use of vendor unique fields and codes. Reserved fields and codes are provided for future standardization.

The SCSI interface uses logical rather than physical addressing for all data blocks. For direct-access devices, each logical unit may be interrogated to determine how many blocks it contains. A logical unit may coincide with all or part of a peripheral device.

The interface protocol includes provision for the connection of multiple initiators (SCSI devices capable of initiating an operation) and multiple targets (SCSI devices capable of responding to a request to perform an operation). Distributed arbitration (i.e., bus-contention logic) is built into the architecture of SCSI. A priority system awards interface control to the highest priority SCSI device that is contending for use of the bus. The time to complete arbitration is independent of the number of devices that are contending and can be completed in less than ten microseconds.

Regarding the logical characteristics of the interface, arbitration is defined to permit multiple initiators and to permit concurrent I/O operations. All SCSI devices are required to be capable of operating with the defined asynchronous transfer protocol.

SCSI commands are classified as mandatory, optional, or vendor unique. SCSI devices are required to implement all mandatory commands defined for the appropriate device type and may implement other commands as well. SCSI devices support commands that facilitate the writing of self-configuring software drivers that can "discover" all necessary attributes without prior knowledge of specific peripheral characteristics (such as storage capacity). Many commands also implement a very large logical block address space ($2^{32}$ blocks), although some commands implement a somewhat smaller logical block address space ($2^{21}$ blocks). Some commands have a consistent meaning for all device types.

Commands for direct-access devices (e.g. magnetic disk), sequential-access devices (e.g., magnetic tape), printer devices, processor devices, write-once devices (e.g., optical WORM disk), CD-ROM devices, scanner devices, optical memory devices, medium changer devices, and communications devices are included. The commands are unique to the device type, or they have interpretations, fields, or features that are specific for the device type. Thus, for example, although the WRITE command is used for several device types, it has a somewhat different form for each type, with different parameters and meanings. Therefore, it is set forth separately for each device type.

Communication on the SCSI bus per the SCSI Standard is allowed between only two SCSI devices at any given time. There is a maximum of eight SCSI devices allowed per SCSI bus. Each SCSI device has a unique ID number assigned from 0 to 7. When two SCSI devices communicate on the SCSI bus, one acts as an initiator and the other acts as a target. The initiator originates an operation and the target performs the operation. A SCSI device usually has a fixed role as an initiator or target, but some devices may be able to assume either role.

An initiator may address up to eight peripheral devices (i.e. Logical Units, LUNs) that are connected to a target. The target may be physically housed within a peripheral device. Up to eight SCSI devices can be supported on the SCSI bus. They can be any combination of initiators and targets provided there is at least one of each.

Certain SCSI bus functions are assigned to the initiator and certain SCSI bus functions are assigned to the target. The initiator may arbitrate for the SCSI bus and select a particular target. The target may request the transfer of COMMAND, DATA, STATUS, or other information on the DATA BUS, and in some cases it may arbitrate for the SCSI bus and reselect an initiator for the purpose of continuing an operation.

The SCSI architecture includes eight distinct phases: BUS FREE phase, ARBITRATION phase, SELECTION phase, RESELECTION phase, COMMAND phase, DATA phase, STATUS phase and MESSAGE phase. The Command, Data, Status and Message phases are collectively termed the information transfer phases. The SCSI bus can never be in more that one phase at any given time.

Although the SCSI Standard provides for communication between many types of devices within a given local bus of eight devices, it does not provide for communication between non-local SCSI buses or to non-SCSI devices. A SCSI device identifies itself to a computer by responding to an inquiry command with the device type field set to indicate what kind of device is attached (e.g., a printer, a magnetic disk, etc.) and with other fields set to indicate the appropriate standards it supports. Each device type has a set of SCSI commands which it supports (e.g., for a SCSI magnetic disk device there is supported a Read command, Write command, Format command and so forth).

There are many device types which can be connected to a SCSI bus such as printers, scanners, optical devices and processor devices. In the future, there likely will be many more. As previously stated, because of the SCSI architecture, there can be only eight typical devices connected to a SCSI bus. These devices or initiators separately send commands to the other devices, targets. As an example an initiator, which might be a SCSI adapter card in a computer, sends a Read command to a SCSI disk, i.e., the target, or sends a Print command to a printer, i.e., yet another target. The commands the initiator uses are usually the SCSI Standard commands for the given device. A computer can have several separate SCSI buses with eight local devices on each. A computer can also have devices which are not based on the SCSI Standard such as an Enhanced Small Device Interface (ESDI) disk or A printer connected to a parallel port.

One alternative method of accessing a device in another computer is to use a Local Area Network (LAN) system. This solution has a number of difficulties for the user. A LAN approach requires significant hardware and software investment and necessitates extensive system overhead. A network requires one network adapter per computer. An abundance of software is needed to implement the communication protocol and handle device sharing. Local Area Networks require the user to learn a new menu of commands. This is extra work for the end user and often adds significant delay in accessing the peripherals.

Accordingly a method is needed to conveniently expand beyond the SCSI standard imposed limit of communication with eight target devices and to provide access to SCSI devices on non-local buses and to non-SCSI devices attached to computers which share a common SCSI bus.

SUMMARY OF INVENTION

This invention comprises a SCSI emulation device and system for providing access to non-SCSI devices or SCSI devices on a non-local SCSI bus via a common SCSI bus thereby providing a practical and economic system for achieving access to a multiplicity of peripherals in a SCSI environment. The target system receives standard SCSI commands and emulates the device being accessed. The initiator sends standard SCSI I/O device driver commands. The target system uses its own Basic Input/Output System (BIOS) and device drivers to access the non-local device and perform the initiator command. Thus, the initiator uses standard I/O device drivers for the given device and the target uses emulation code with redirection and/or translation routines to look like a standard SCSI device.

Application programs running in the initiator system, work without revision as long as they use standard device drivers. They access the non-SCSI or non-local device on another computer as if it were local to their own computer. The user has the benefit of not needing to learn and remember additional commands to access devices on the other computers. In fact, the standard device drivers are used as if the peripheral units were integral with the basic system. Code size is reduced significantly since there is no software overhead for the initiator, and a device driver for the emulating target requires no screen graphics or user interface. When SCSI is standard on a computer, no additional hardware is necessary to support remote device access within another computer except a cable to connect them, and the appropriate software to support the SCSI target and device emulation functions.

DESCRIPTION OF THE INVENTION

Figure 1:
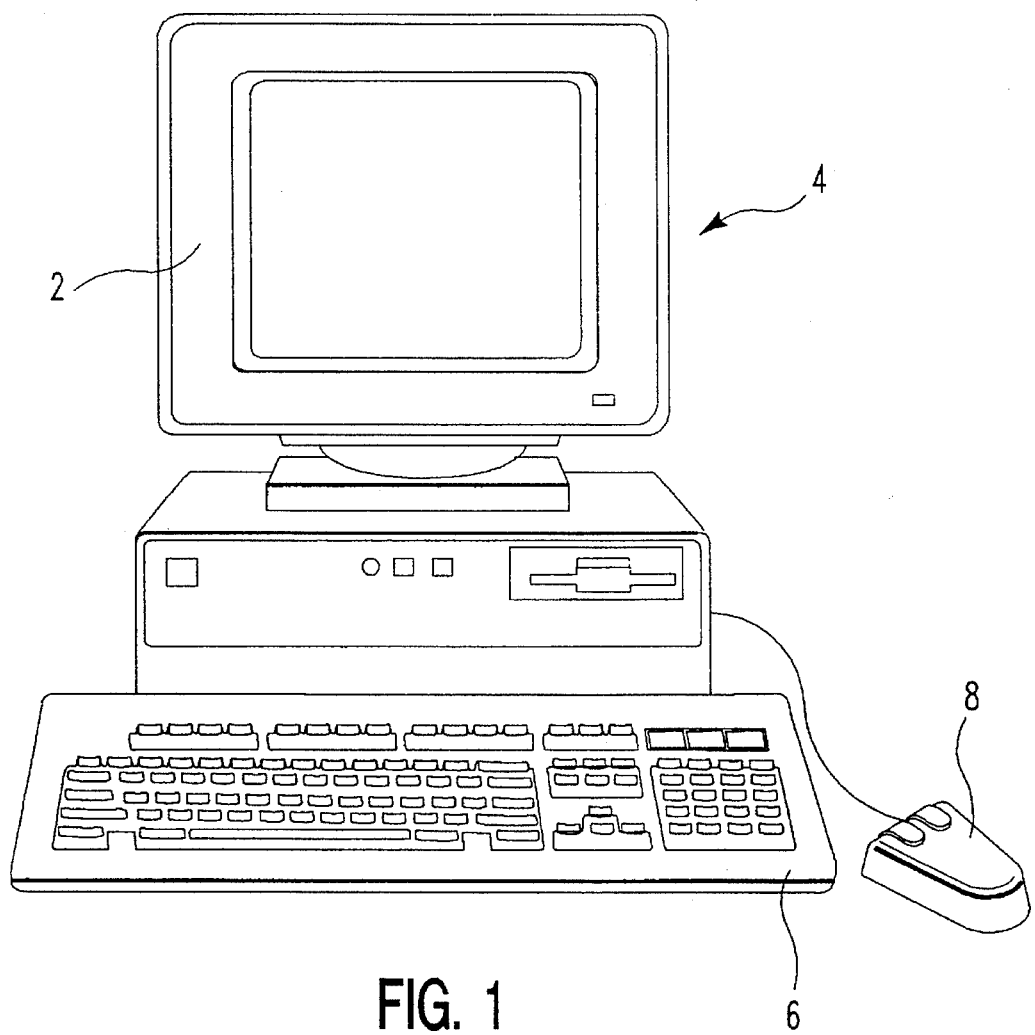
FIG. 1 is an exemplary computer system embodying the invention.

The described invention is operable in conjunction with the IBM PS/2 computer series and all compatibles, as exemplary presented in FIG. 1. The terminology and selected function calls are normal and are in accordance with standard references for the personal computer PS/2 such as OS/2 Programmer's Guide written by Ed Iacobucci and published by Osborne McGraw-Hill. The inventive interface is for inclusion in a system which generally comprises a display 2 and a processing system 4, which are controlled and inputted externally by a keyboard 6 and mouse 8.

The exemplary system of FIG. 1 is equally suitable for an initiator and a target system operable with individual peripherals and appropriate device drivers in an environment incorporating SCSI architecture. The IBM PS/2 SCSI Adapter with cache is an example of a SCSI adapter which supports both initiator and target functions and would be suitable for implementation of this invention in the target system.

For SCSI architecture a command is comprised of two or more of the following phases: Selection, Reselection, Message Out, Command, Data In, Data Out, Status and Message In. The present inventive contribution is concerned with SCSI commands with a command phase. Those commands without a command phase can be handled with or without system intervention. Those commands with a command phase are comprised of the following sequence of phases: Selection, Message out (optional), Command, Data (optional), Status and Message In. A target may release (disconnect) the SCSI bus at any time by sending a disconnect Message In to the initiator to tell the initiator it is disconnecting. This can be done with or without system intervention.

Figure 2:
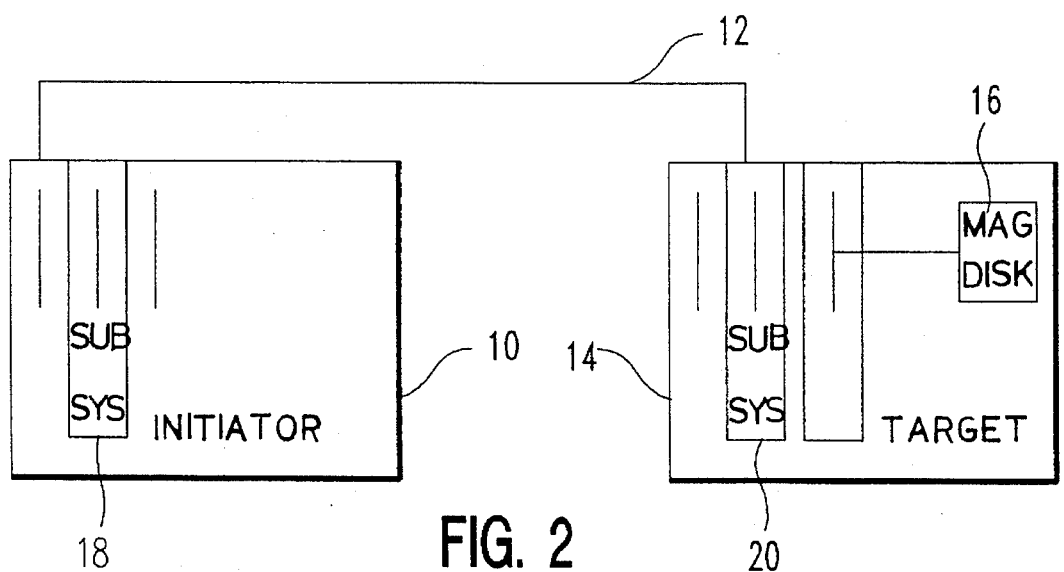
FIG. 2 is a schematic illustration of a SCSI initiator and target computer system with a targeted peripheral.

In FIG. 2, an exemplary illustration of an inventive configuration for implementing the present invention is disclosed and included as a part of the exemplary processing system 4 of FIG. 1. An initiator system 10 is connected by an SCSI bus 12 to a target system 14. The initiator system 10 will access a hardfile 16 local to the target system 14 which is not on the initiator system SCSI bus 12. The SCSI subsystems 18 and 20 of initiator system 10 and target system 14, respectively, are schematically shown as SCSI adapter cards which plug into the system I/O bus 12.

The initiator system 10 requires no special microcode as long as it is powered up after the target system 14 has set up its target device emulation code. If the initiator system 10 is powered up before the target system 14 is ready, the situation is the same as powering up the system 10 before an external SCSI device is turned on. The Power On Self Test (POST) code will not know the device exists and will indicate a configuration error. If it is the case that the initiator system 10 is powered on before the target system 14, the initiator user can power on the target system 14 and re-boot the initiator system 10. For this example, the assumption will be that the initiator system 10 will power on after the target system 14 has power and the device emulation code has been initialized.

Figure 3:
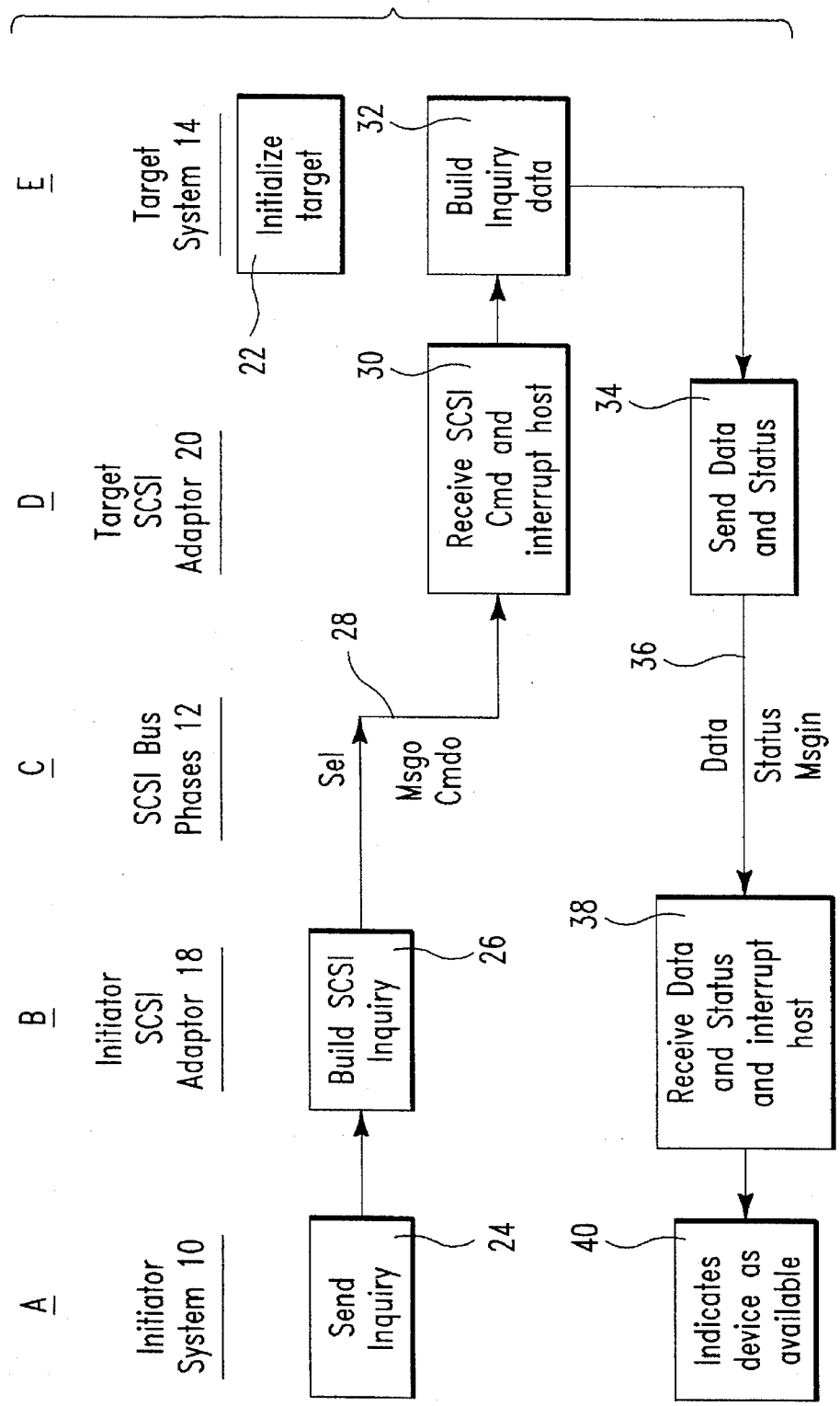
FIG. 3 is a power on sequence and communication flow chart for implementing the invention.

The initiator system 10 Power On sequence and communication flow is shown in FIG. 3. Illustrated in FIG. 3, are the following five columns: Column A—Initiator System, Column B—Initiator SCSI Adapter, Column C—SCSI Bus Phases (completed), Column D—Target SCSI Adapter, and Column E—Target System. On the SCSI bus connection 12 illustrated in FIG. 2, the following phases will occur to complete one SCSI command where the following phases and their abbreviations are set forth: Selection (Sel), Message Out (Msgo), Command (Cmdo), Data In (Data), Status In (Status), Message In (Msgin). The target system 14 powers on and enables the target SCSI subsystem 20 to receive commands, as identified by FIG. 3 in sequence box 22. The initiator system 10 powers on and the BIOS POST issues Inquiry commands to see what devices are connected to the SCSI bus 12, as identified by sequence box 24. The initiator SCSI adapter 18 of Column B builds a SCSI inquiry command as identified by sequence box 26 and selects the target system 14, as illustrated by the command on line 28 from sequence box 26. The target system SCSI 20 accepts the Message Out and Command on line 28. The target adapter 20 transfers the command to the memory of target system 14 and interrupts the target system, as identified by sequence box 30. The target system 14 device emulation code recognizes the command as an inquiry command and builds the inquiry data, as identified by sequence box 32. The target system 14 device emulation code commands the target SCSI adapter 20 to send the inquiry data as set forth in sequence box 34. Inquiry data is received by the initiator adapter 18 on line 36 as identified by sequence box 38. The initiator system's standard POST code recognizes the device as being present, as identified by sequence box 40.

Figure 4:
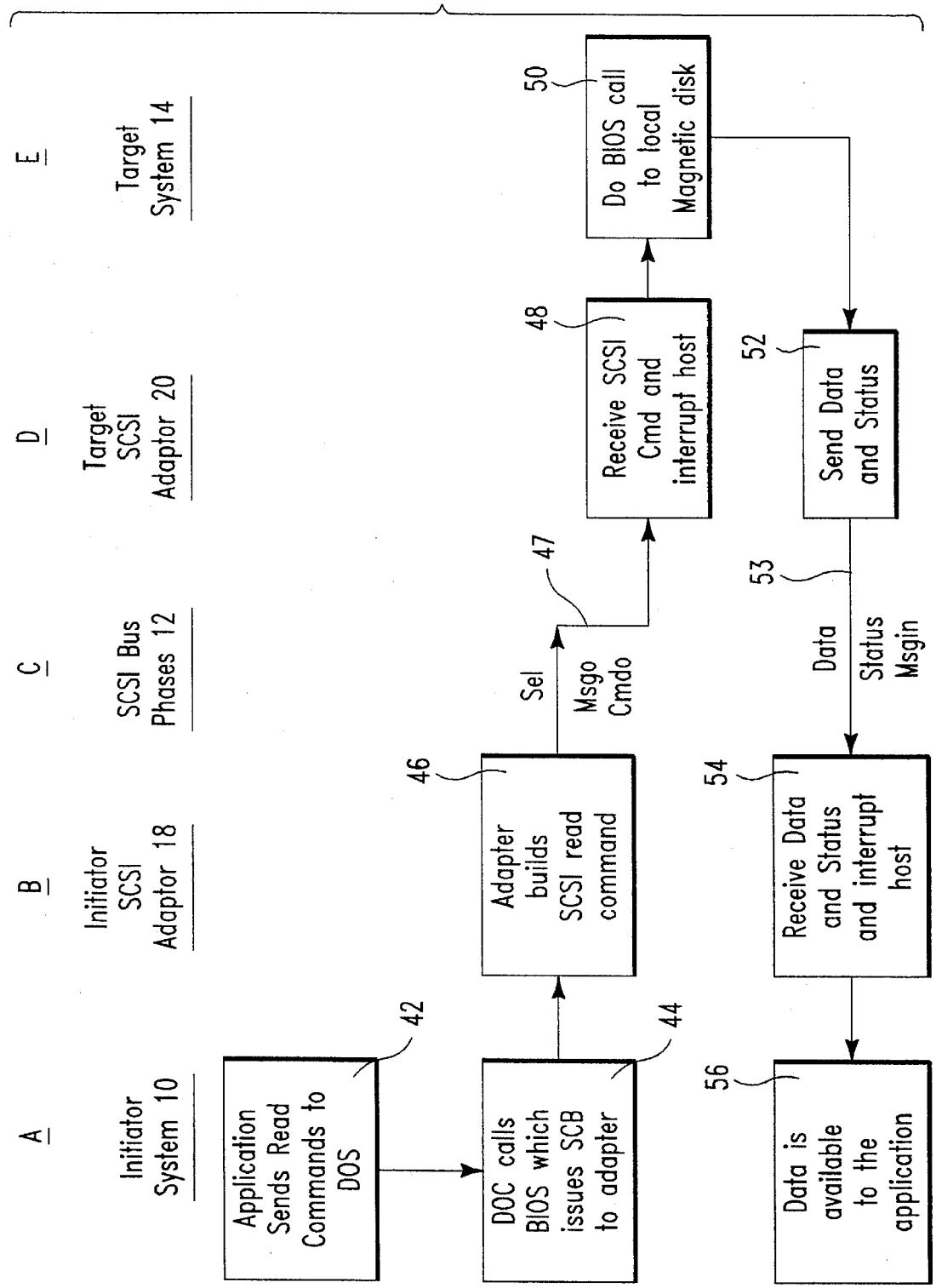
FIG. 4 is an accessation sequence and communication flow chart for implementing the invention.

The device 16 is now available to the initiator system and can be accessed by any routine which accesses local peripheral devices. An example of such an interaction is given in FIG. 4 utilizing the identified columns A–E of FIG. 3. An application program requests a Read command from the target system magnetic disk 16. The program assumes the magnetic disk 16 is local to the initiator system 10 of FIG. 2. The DOS operating system calls the initiator system's BIOS identified by sequence box 42, which builds the Read Subsystem Control Block (SCB) as identified by sequence box 44. The initiator SCSI adapter 18 builds the SCSI Read command, as identified by sequence box 46, and selects the target system 14 as if the target system 14 were the magnetic disk 16, as identified by line 47. The target adapter 20 receives the Read command and interrupts the target system 14 as identified by sequence box 48. The target system 14 recognizes the command on line 47 as a Read command to the hardfile 16. The target system 14 calls the local BIOS to do a Read on the local hardfile 16, as identified by sequence box 50. The target system 14 loads the data in a local buffer, of a type well known in the art, and tells the target adapter card 20 to send the data to the initiator, as identified by sequence box 52. The initiator adapter 18 receives the data on line 53 as identified by sequence box 54 and interrupts the initiator system 10 with the data available, as further identified by sequence box 56.

The emulation code required by the target system 14 of FIG. 2 can be implemented as a resident device driver. This device driver will allow the two systems to share a read only database. It exemplifies the processes of device sharing, BIOS synchronization and redirection/translation of data and commands.

Figure 5:
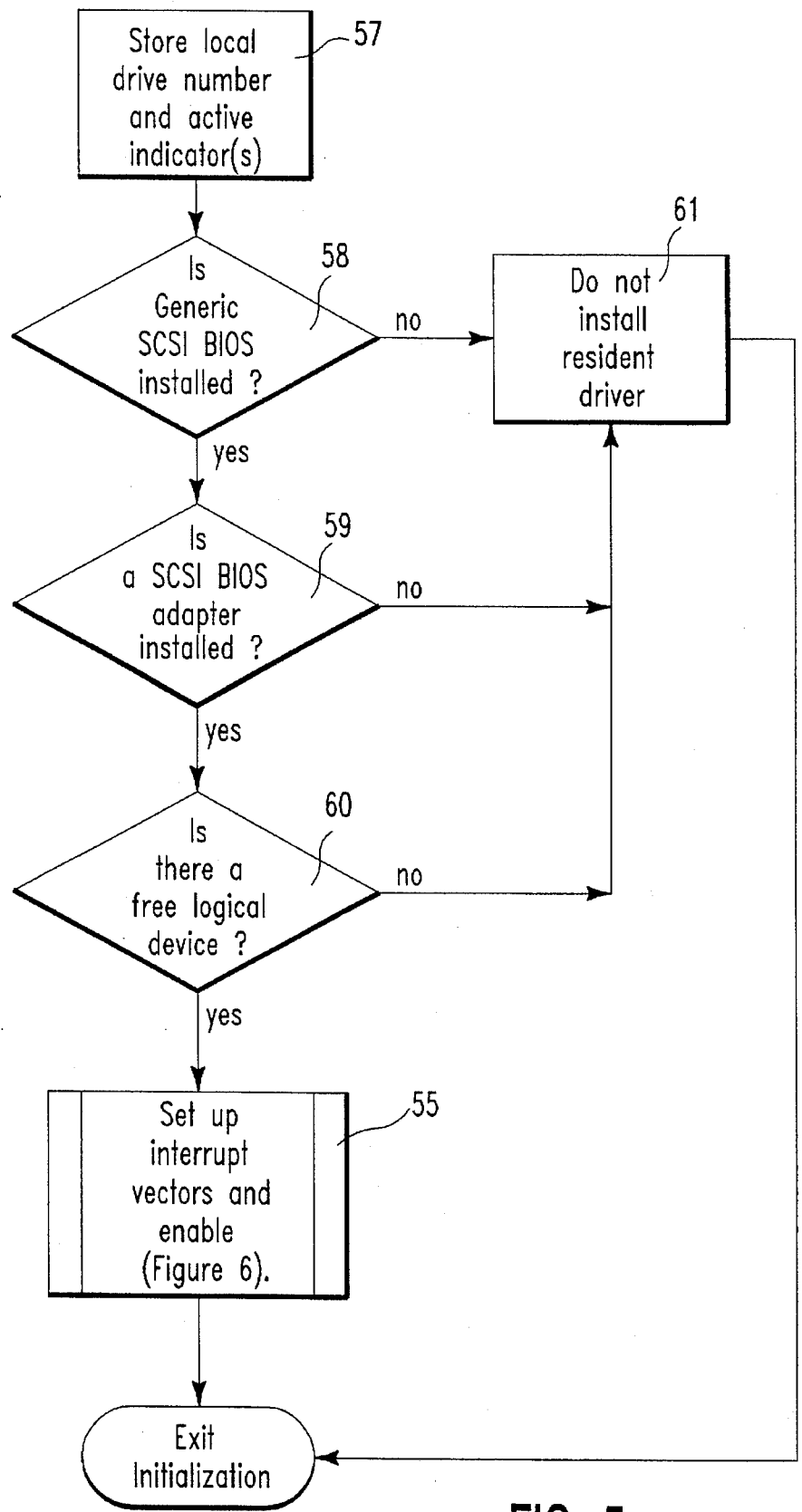
FIG. 5 is a resident device driver emulation code flow chart for initialization in accordance with the present invention.

The device driver initialization code within block 57 of FIG. 5 determines the local fixed disk which will be emulated and the initiator to which the SCSI adapter will respond. The initialization code checks for generic BIOS installed in the system as depicted by step 58, for a SCSI adapter 20 installed in the system 14 as illustrated within step 59 and for a free logical device number on the SCSI adapter 20 as in block 60. If any of these are not installed or available the resident driver is not installed as set forth by block 61.

Figure 6:
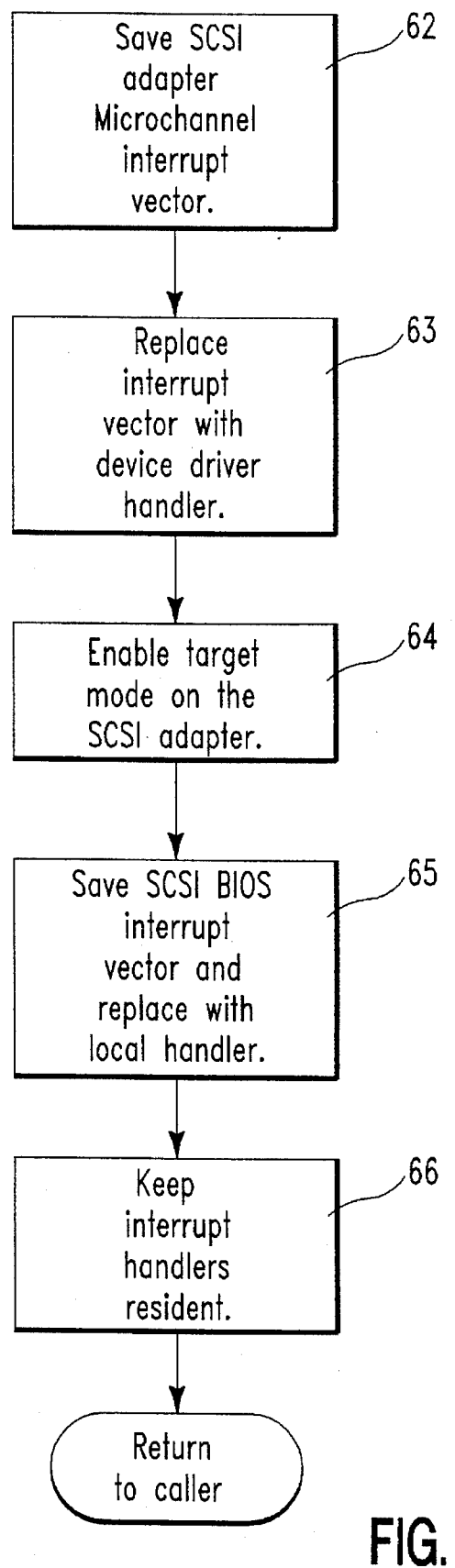
FIG. 6 is an emulation code flow chart for set up of the hardware and software interrupt vectors and enabling the target adapter in accordance with the present invention.

If the necessary environment is available, the step from block 60 is to block 55 depicting then the initialization code which saves the SCSI adapter Micro Channel™ interrupt vector as set forth in block 62 of FIG. 6 for interrupt chaining. This interrupt vector is replaced by the device driver SCSI adapter interrupt handler as in step 63. The free logical device number on the SCSI adapter is initialized as a target for the said initiator in the following step 64. The SCSI BIOS interrupt vector is saved for interrupt chaining and this interrupt vector is replaced by the device driver BIOS fixed disk interrupt handler as illustrated in block 65. The interrupt handlers are kept as resident routines as shown in block 66. Initialization is now complete.

Figure 7:
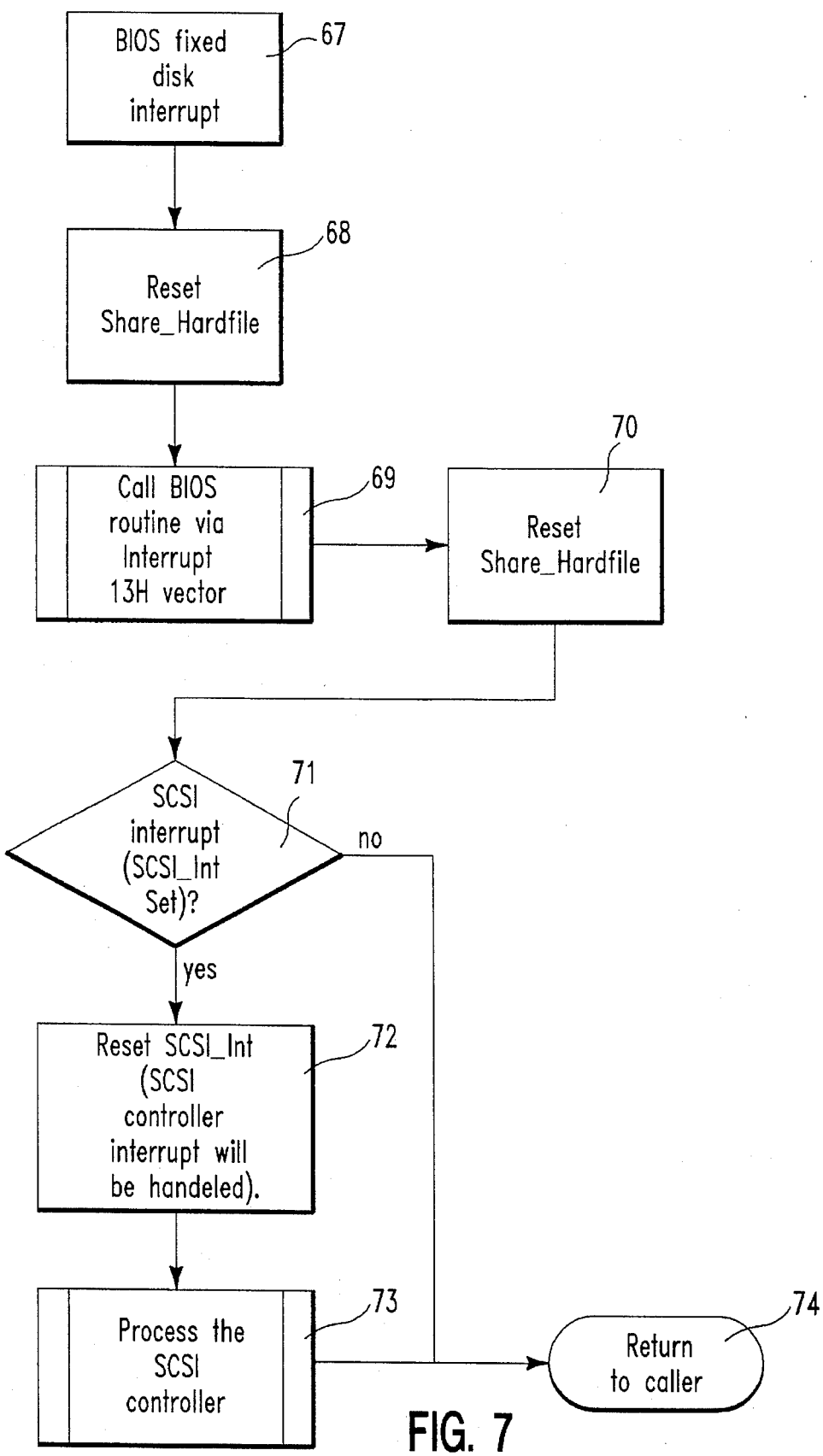
FIG. 7 is a BIOS fixed disk software interrupt intercept and synchronization code flow chart in accordance with the present invention.

BIOS call synchronization is accomplished by intercepting all fixed disk BIOS software interrupts as shown in block 67 of FIG. 7. A flag is set called Share_Hardfile in step 68 before calling the real fixed disk BIOS routine as set forth in block 69. Upon return from this routine, Share_Hardfile is reset as in block 70.

Figure 8:
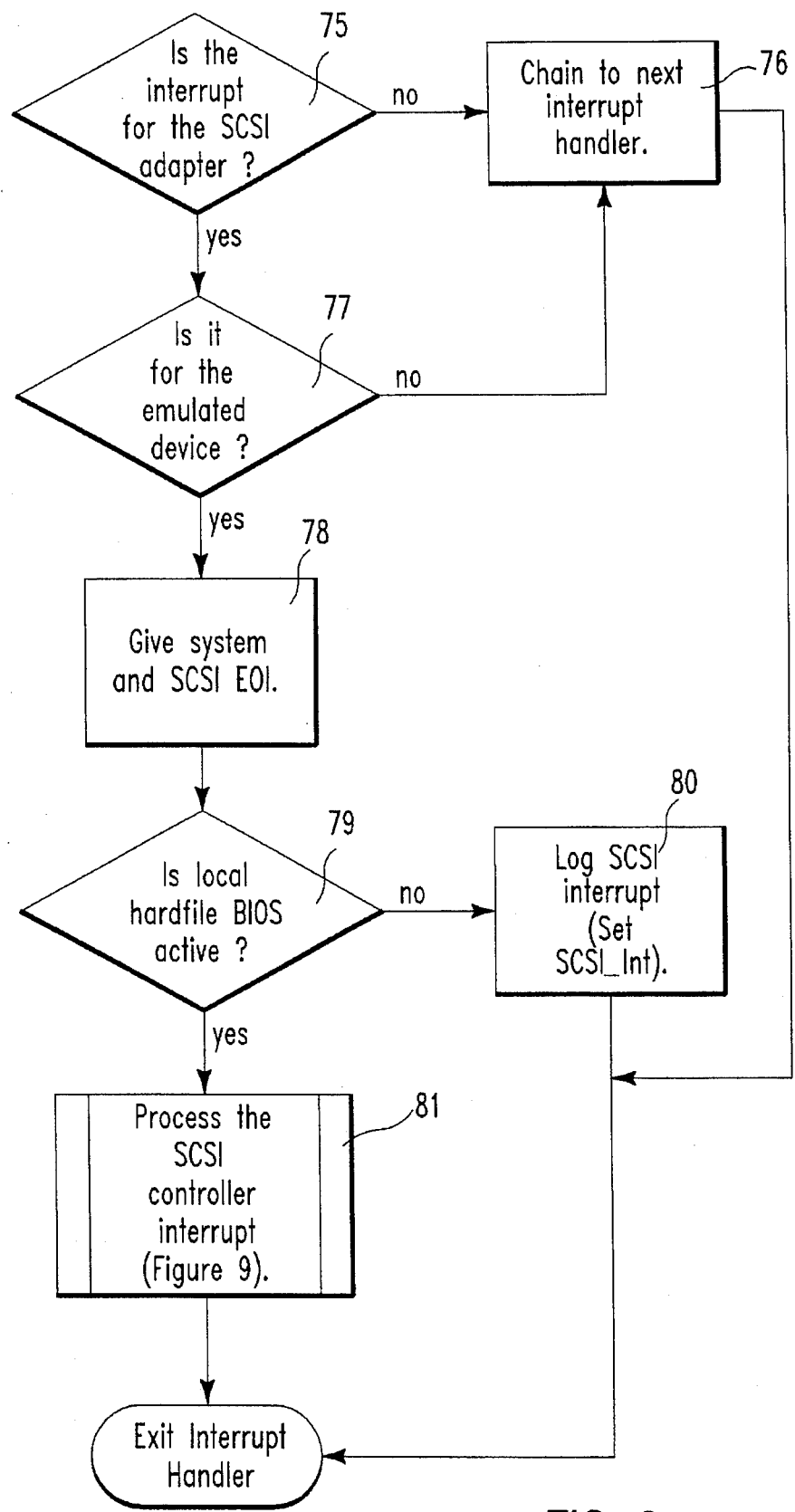
FIG. 8 is a Micro Channel™ SCSI adaptor hardware interrupt handler in accordance with the present invention.

The SCSI adapter hardware interrupt is also intercepted as illustrated by 75 of FIG. 8. If Share_Hardfile is active, as determined at step 79, then a call to the fixed disk BIOS is not made and a flag is set, shown by SCSI_Int at block 80, to log the occurrence of a hardware SCSI interrupt for the emulated device.

For the BIOS software interrupt see FIG. 7 where SCSI_Int is checked at step 71 following the reset of Share_Hardfile as before mentioned in block 70, thus insuring all hardware SCSI adapter interrupts will be serviced. If SCSI_Int is not set then the BIOS interrupt is complete as illustrated by step 74. Otherwise SCSI_Int is reset at step 72 and the hardware interrupt is processed at step 73. This prevents a higher priority hardware interrupt from interrupting a BIOS interrupt. This ensures that the fixed disk BIOS routine is not called recursively which is not allowed by BIOS for the DOS operating system.

For a SCSI adapter hardware interrupt, as illustrated in FIG. 8, the handler determines if the emulated SCSI adapter is the source, as before mentioned regarding step 75. If not, it chains to the next interrupt handler at block 76. If the interrupt is for the emulated device as determined at step 77, an end of interrupt command (EOI) is given to the adapter 20 and the system 14 at step 78. If the local hardfile BIOS interrupt is not active as determined at step 79, the hardware interrupt for the emulated device is processed as illustrated at block 81.

Figure 9:
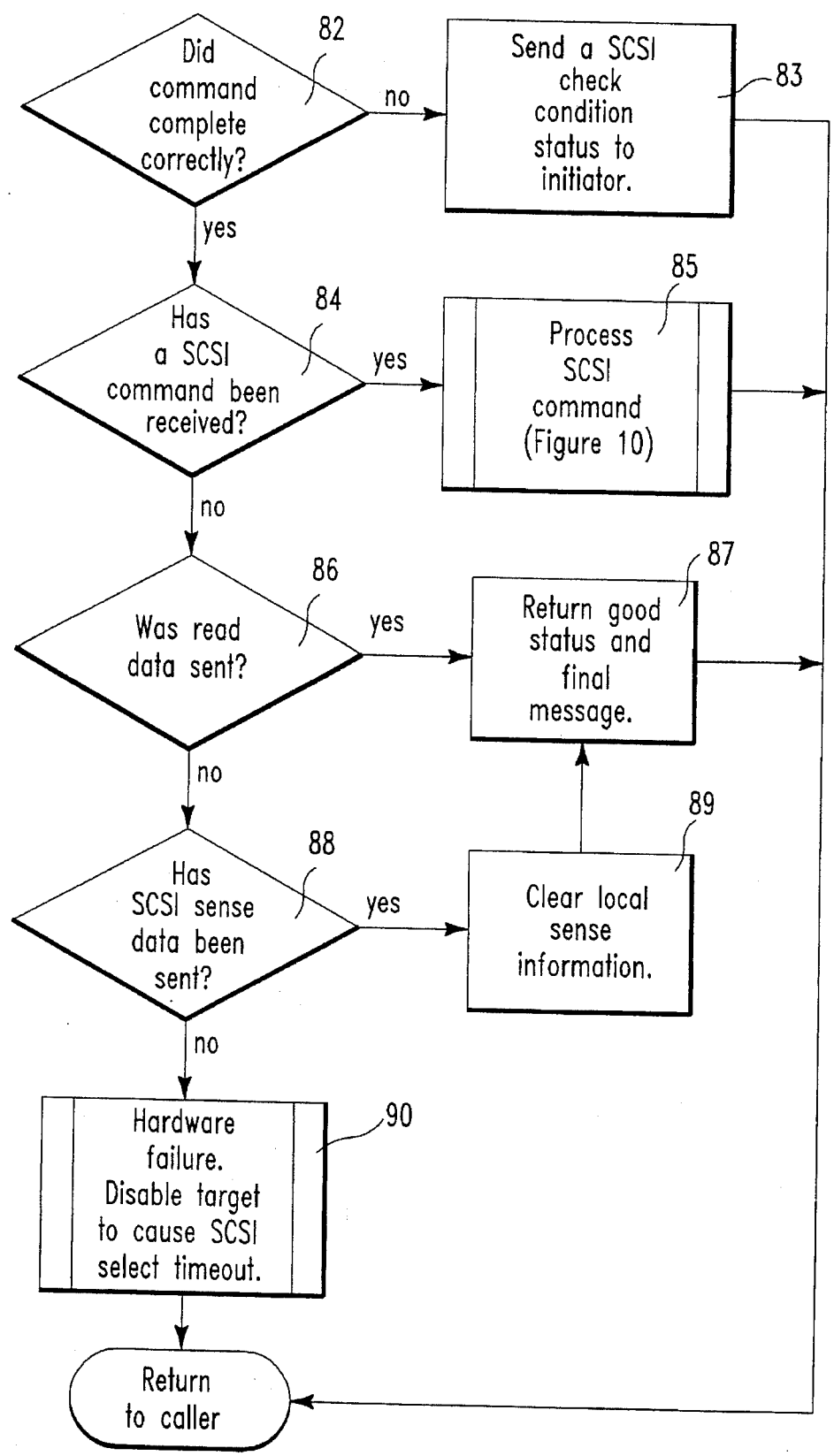
FIG. 9 is an emulation code flow chart for processing of the SCSI adapter hardware target mode interrupt in accordance with the invention.

FIG. 9 describes the processing of the SCSI adapter hardware interrupt. If the given command did not complete successfully at step 82, the sense code in the local sense area is updated with the error, and a check condition status byte is sent back to the initiator at block 83 and a command complete message is also sent. The device driver in the initiator will handle this error as it would any other standard SCSI error. If a new SCSI command has been received from the initiator as determined at step 84, the command is processed, as illustrated by block 85. If read data was sent successfully as set forth in block 86, good status and a command complete message is returned as set forth in block 87. If sense data has been sent successfully as illustrated at step 88, the local sense area is cleared at step 89 and good status/message is returned to block 87. If none of these conditions occurred, there is a hardware failure and the emulated device is disabled as depicted at block 90, causing a selection timeout to the initiator. A selection timeout will be interpreted by the standard SCSI device driver on the initiator as a hard error.

Figure 10:
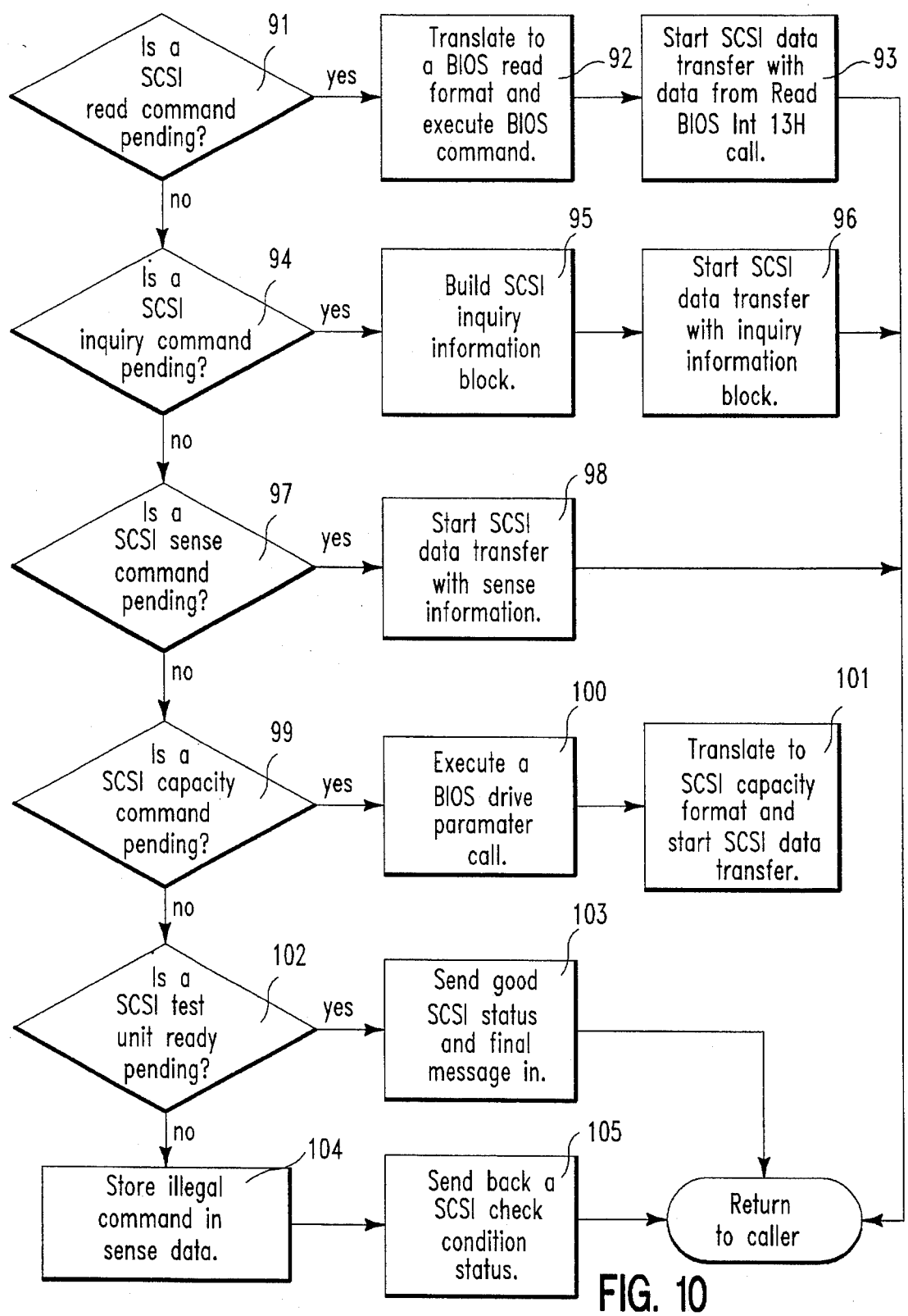
FIG. 10 is an emulation code flow chart for processing a SCSI command in accordance with the present invention.

FIG. 10 describes the processing of a SCSI command. If the command from the initiator is a read command illustrated at block 91, the command is translated to a BIOS fixed disk read function call at step 92. When complete, the data received is returned to the initiator through the emulated target at block 93. If a SCSI inquiry command is received from the initiator at block 94, an inquiry data block is built at block 95 and the data is sent back to the initiator at step 96. If a SCSI request sense command is received at step 97, the current sense information for the emulated device is returned at step 98. If a read device capacity command is received at block 99, a BIOS return drive parameter call is sent to the local fixed disk BIOS at block 100. The information is translated to the SCSI read device capacity data format and returned to the initiator as illustrated at block 101. If a SCSI test unit ready is received at 102, good status and message is returned through block 103 since the emulated target is ready for information transfer. Otherwise an illegal command was received. The local sense data is updated with illegal request as the sense key at step 104 which will be returned in response to the next request sense command at step 97. Check condition status is then sent back to the initiator as illustrated at block 105.

Target emulation is typically accomplished by a memory resident device driver. This example DOS device driver intercepts the hardware and software interrupts. BIOS call (software interrupt) and hardware interrupt synchronization is accomplished by sharing control flags. Redirection of interrupts and translation of SCSI/BIOS information is done within the interrupt handlers. Target emulation routines (device drivers) could be written to support various types of devices and functions using similar structures under DOS or other operating system environments. Consideration must be given to device sharing support based on the number of possible initiators and particular emulated device characteristics.

While the invention has been shown and described with reference to particular embodiments thereof, it will be understood by those skilled in the art that the foregoing and other changes and details may be made therein without departing from the spirit and scope of the invention.

What is claimed is:

1. A computer network system of two computers having BIOS software dependency wherein the first computer accesses a remote peripheral device of the second computer, comprising:

a first computer including a first Small Computer System Interface (SCSI) adapter;

a second computer including a second SCSI adapter with at least one remote peripheral device;

a SCSI bus communications link between the first and second SCSI adapters; and memory resident emulation means in the second computer emulating a SCSI remote peripheral device for direct access of the SCSI remote peripheral device by the first computer and emulating a non-SCSI remote peripheral device for direct access of the non-SCSI remote peripheral device by the first computer upon command by the first computer and providing for proper sharing of any BIOS software interrupt which supports remote peripheral device access by both the first and second computers upon command by the first computer such that proper hardware and software priority operation is maintained and providing synchronization procedures to preclude BIOS software interrupt recursion.

* * * * *